United States Patent [19]

Peterson, Jr.

[11] Patent Number: 5,616,964
[45] Date of Patent: Apr. 1, 1997

[54] LAWN AND GARDEN TRACTOR INTERLOCK CIRCUIT

[75] Inventor: Rudolph A. Peterson, Jr., Beaver Dam, Wis.

[73] Assignee: Deere & Company, Moline, Ill.

[21] Appl. No.: 529,968

[22] Filed: Sep. 19, 1995

[51] Int. Cl.⁶ ............................. B60K 41/28; B60K 28/00
[52] U.S. Cl. ........................... 307/9.1; 180/273; 180/53.1; 477/203
[58] Field of Search .................................. 307/9.1–10.8; 180/271, 272, 273, 53.1, 53.6, 53.7, 53.8; 188/109; 477/171, 203; 192/4 A, 12 D; 172/74, 492

[56] References Cited

U.S. PATENT DOCUMENTS

| | | | |
|---|---|---|---|
| 3,999,643 | 12/1976 | Jones | 477/87 |
| 4,294,327 | 10/1981 | Howard | 180/273 |
| 4,355,698 | 10/1982 | Barnes | 180/273 |
| 4,651,018 | 3/1987 | Peterson, Jr. | 307/10.6 |
| 4,974,711 | 12/1990 | Peterson, Jr. et al. | 192/12 D |
| 5,109,945 | 5/1992 | Koga | 180/273 |
| 5,203,440 | 4/1993 | Peterson, Jr. | 477/171 |
| 5,314,038 | 5/1994 | Peterson, Jr. | 180/274 |
| 5,425,431 | 6/1995 | Brandt | 180/273 |

OTHER PUBLICATIONS

Company unknown, Wiring Diagram, 1 page, dated 28 Jun. 1995, Published in the U.S.A.

*Primary Examiner*—William M. Shoop, Jr.
*Assistant Examiner*—Peter Ganjoo

[57] ABSTRACT

A simple operator presence override circuit is connected between available terminals on a PTO switch and a brake switch, and to the seat relay of the operator presence system. The override circuit permits continued operation of the engine under certain restricted conditions when the operator leaves the vehicle seat. A blocking diode connects one side of the seat relay to ground via the brake switch and one set of terminals on the PTO switch. With the PTO switch in the off condition and the vehicle braking system activated so the brake switch is closed, the seat relay remains activated to prevent operation of the ignition grounding circuit that otherwise would shut the engine down when the operator leaves his seat. Switching the PTO switch on or deactivating the braking system without an operator on the seat will automatically open the seat relay so that the engine is killed.

8 Claims, 1 Drawing Sheet

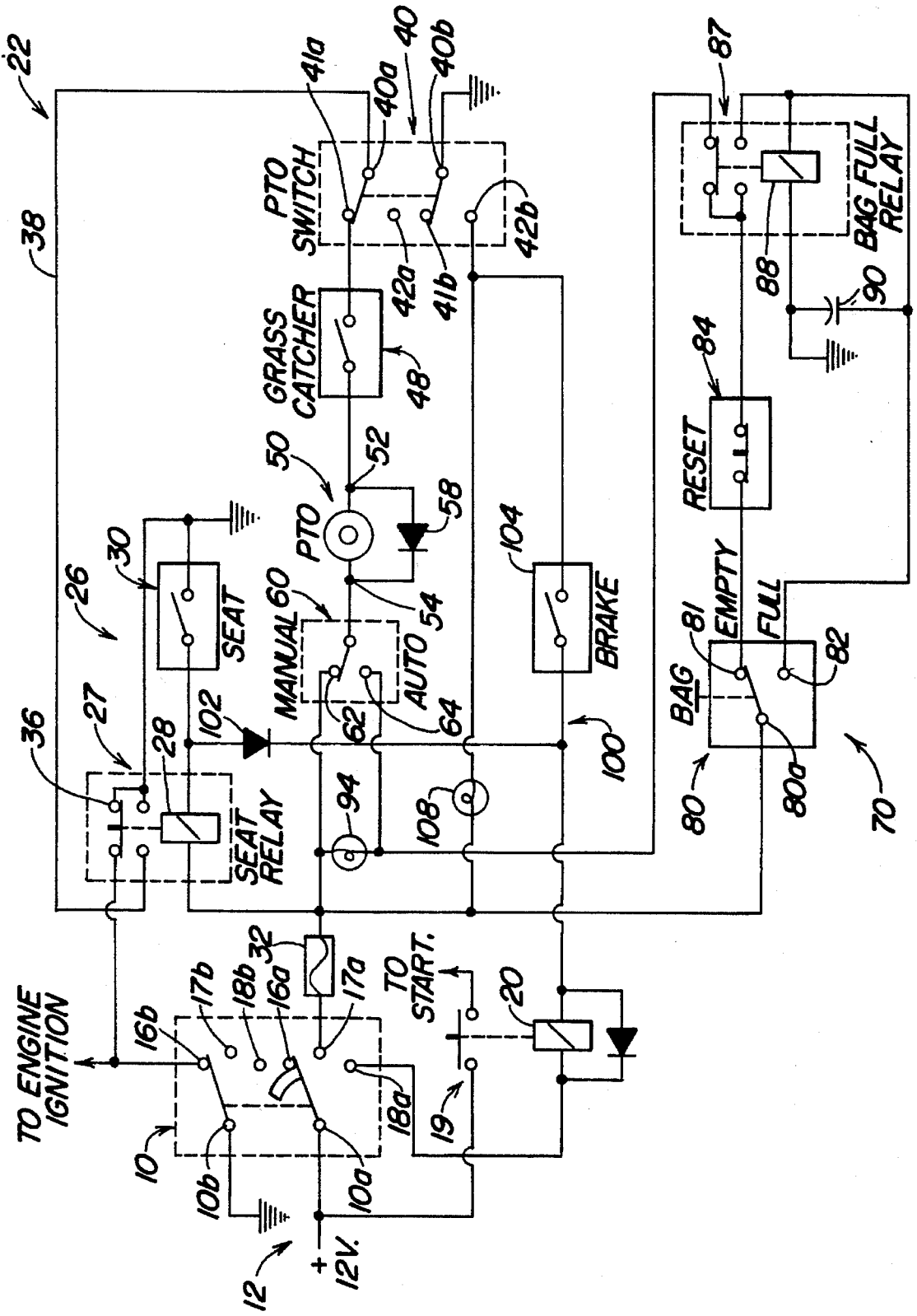

LAWN AND GARDEN TRACTOR INTERLOCK CIRCUIT

BACKGROUND OF THE INVENTION

1) Field of the Invention

The present invention relates generally to lawn and garden tractors or similar vehicles, and more specifically to a circuit for allowing the engine of such a vehicle to crank and run without an operator being present at the operator station, provided certain drive conditions are met.

2) Related Art

Some presently available lawn and garden tractors having a transmission and a selectively activatable power take off (PTO) include interlock circuits to prevent engine cranking or running unless an operator presence switch, such as a seat switch, is activated. An example of such a circuit is shown in commonly assigned U.S. Pat. No. 4,651,018. A particularly annoying problem with many of the interlock circuits for lawn and garden tractors is the need for a second person to remain on the seat when the operator is making adjustments on a running engine. Some existing lawn and garden tractors have circuits such as shown in U.S. Pat. No. 5,203,440, also of common ownership with the present application, to permit the engine to crank and run without an operator on the seat as long as the transmission is in neutral and the PTO is switched off. However, providing the crank and run without operator feature on existing lawn and garden systems that require activation of an operator presence switch usually involves an extensive and costly circuit modification.

BRIEF SUMMARY OF THE INVENTION

It is therefore an object of the present invention to provide an improved interlock circuit for a lawn and garden tractor or similar vehicle. It is a further object to provide such an improved circuit which overcomes most or all of the aforementioned problems.

It is a further object of the present invention to provide an improved interlock circuit which facilitates one person engine adjustment and obviates the need for a second person to activate an operator presence switch or the like. It is a further object to provide such a circuit which is quickly and inexpensively adaptable to existing interlock circuits which, before adaptation, required activation of the operator presence switch to maintain the engine running.

It is still another object of the present invention to provide an improved interlock circuit which advantageously utilizes a set of existing contacts on the PTO switch and a brake or transmission switch to maintain the engine running, under limited operating conditions, without an operator present at the operator station to activate an operator presence switch or the like.

An interlock system constructed in accordance with the teachings of the present invention includes a simple circuit connected between normally unused terminals on the PTO switch and a brake or transmission switch and the seat relay of the operator presence system. A diode connects one side of the seat relay to ground via the brake or transmission switch and one set of terminals on the PTO switch. With the PTO switch in the off condition and the vehicle braking system activated so the brake or transmission switch is closed, the seat relay remains activated to prevent operation of the ignition kill circuit that otherwise would shut the engine down when the operator leaves his seat. Switching the PTO switch on or deactivating the braking system without an operator on the seat will automatically open the seat relay so that the ignition kill circuit shuts down the engine. The modification is very simple and inexpensive, and eliminates the need for an expensive and time-consuming rewiring of the vehicle to convert the vehicle from one that will run only when an operator is present on the vehicle seat to one wherein engine operation can be sustained under limited conditions without an operator on the seat so that engine adjustment can be made more conveniently without need for a second person to activate the operator presence switch.

These and other objects, features and advantages of the present invention will become apparent to one skilled in the art upon reading the following detailed description in view of the drawings.

BRIEF DESCRIPTION OF THE DRAWINGS

The single drawing FIGURE is a schematic for a lawn and garden tractor showing an interlock circuit which provides limited engine operation without an operator present on the vehicle seat.

DETAILED DESCRIPTION OF THE DRAWINGS

Referring now to the drawing FIGURE, therein is shown circuit schematic for a vehicle such as a lawn and garden tractor having an ignition switch 10 with switch input terminals 10a and 10b connected to the positive terminal and the negative or ground terminal, respectively, of a source of electrical power such as a battery 12 on the vehicle. The switch 10 has output terminals 16a, 17a, 18a and 16b, 17b, 18b. In an off position of the switch 10 (shown) the terminal 16b is grounded. The switch 10 has a run position (center position) wherein the terminal 17a is connected to the positive terminal of the battery 12, and a start position (lowermost position) wherein both the terminals 17a and 18a are connected to the positive terminal. A starter relay 19 includes a relay coil 20 having one terminal connected to the terminal 18a of the switch 20 and an opposite terminal connected to a selective grounding circuit which forms a portion of interlock circuitry indicated generally at 22. When the relay 20 is activated, a circuit between the battery 12 and the vehicle starter is activated to crank the engine.

The terminal 16b is connected to the ignition or magneto circuit on the engine so that when the switch 10 is in the off position, the ignition circuit will be grounded and the engine will be killed. The terminal 16b is also connected to the interlock circuitry 22 which includes an operator presence switch structure indicated generally at 26 which under selected conditions also grounds the ignition circuit to kill the engine when the operator moves away from the operator station. The operator presence switch structure 26 includes a relay 27 with a coil 28 having a first lead connected to one terminal of a seat switch 30. A second terminal of the seat switch 30 is connected to ground. The second lead of the relay coil 28 is connected through a fuse 32 to the switch terminal 17a so that when the switch 10 is in the run or start positions and the first lead is grounded, the relay 27 will be activated. When the relay coil 28 is inactivated (as shown in the figure) the ignition circuit is grounded through upper or grounding relay terminals 36 so the engine will not run. Activation of the relay 27 by having the switch 10 in the start or run positions when the second terminal is grounded (either by closing of the seat switch 30 or through an alternate grounding circuit, as described below) provides a ground for a wire 38 through the lower relay terminals.

The wire 38 connects the grounding terminal 36 of the relay 27 with one input terminal 40a of a drive accessory or PTO switch 40. A second input terminal 40b of the switch 40 is grounded. The PTO switch 40 has respective output terminals 41a, 42a and 41b,42b. In an on position (shown) the wire 38 and terminal 40a are connected to a first terminal of condition responsive switch 48. Preferably, the switch 48 is grass catcher or bag presence switch which closes only when the grass bag is in position on the vehicle. The opposite terminal of the switch 48 is connected to ground side terminal 52 of the activation coil of an electric PTO clutch 50. When opposite side terminal 54 of the clutch activation coil is connected to the positive terminal of the battery 12, the PTO will be activated so long as the switch 48 is closed, the PTO switch is on, and the wire 38 is grounded through an activated seat relay 27. A diode 58 connected between the sides 52 and 54 of the activation coil limit reverse voltage spikes.

The positive input terminal 54 to the PTO activation coil is connected to a mode selection switch 60. The mode selection switch 60 has a manual mode position (shown) wherein the terminal 54 is connected directly via terminal 62 and the fuse 32 to the positive supply terminal of the battery 12 when the switch 10 is in the on or run positions. The switch 60 also has an automatic mode position wherein a terminal 64 is connected to a condition responsive circuit indicated generally at 70 so that the PTO 50 can only be activated if the circuit 70 indicates that the desired condition is present.

As shown in the figure, the circuit 70 is grass bag fill condition responsive circuit which is connected between the positive supply terminal of the battery 12 and the terminal 64 so that when the switch 60 is in the automatic mode position (down), the PTO can not be powered if the circuit 70 detects that the grass bag is full. The circuit 70 includes a bag condition switch 80 having an input terminal 80a connected to the positive supply of the battery 12, and output terminals 81 and 82. The output terminal 81 is connected to a normally closed reset switch 84 which in turn is connected to one set of switched terminals of a bag full relay 87. The switch terminal 82 is connected to a first side of a relay coil 88 for the relay 87, and the opposite side of the coil 88 is grounded. A delay capacitor 90 is connected to the first side of the coil 88. When the bag on the vehicle is less than full, the switch 80 will be in the position shown so that relay will be in the inactivated position (shown) and power to the terminal 64 of the mode selection switch is provided through the switches 80 and 84 and through the upper switched terminals of the relay 87. When the grass bag reaches a filled condition, the switch 80 changes to the down position to activate the relay 87 and remove power from the terminal 64 of the switch 60, thereby stopping the PTO if the switch 60 is in the automatic mode (down). One of the lower switched terminals of the relay 87 is connected to the first side of the relay coil 88 to bootstrap the relay 87 to the activated condition. After the operator empties the bag, the switch 80 returns to the upper position, and the relay 87 remains bootstrapped to the activated condition through the reset switch 84 and the lower switched terminals of the relay. To reset the circuit 70 for operation of the PTO with the switch 60 in the automatic mode (down), the reset button on the switch is pushed to temporarily open the circuit to the relay coil 88, thereby deactivating the relay 87 so that power is again supplied to the terminal 64 of the switch 60. An indicator lamp 94 is connected between the switched power source and the terminal 64 of the switch 60 to give a visual indication when the bag full Sensor trips and shuts power off to the automatic terminal 64 of the switch 60.

An operator presence override circuit indicated generally at 100 is connected between the operator presence switch structure 26 and the PTO switch 40 for providing an alternate path to ground from the seat relay 27 through the PTO switch 40. The circuit 100 includes a blocking diode 102 connected between the seat relay coil 28 and a first terminal on a brake or vehicle ground drive condition switch 104 connected to a ground drive with brake structure for providing vehicle drive and non-drive conditions. The second terminal of the brake switch 104 is connected to the terminal 42b of the PTO switch 40. The brake switch 104 is open as shown when the vehicle is in the operating or non-braked condition. Placing the vehicle in the braked or park position causes the switch 104 to close and provide a path from the relay coil 28 to the terminal 42b so that when the PTO switch 40 is moved to the off (down) position, a path to ground is provided for current flowing through the relay coil 28. In addition, one terminal of the starter relay coil 20 is also connected through the brake switch 104 and the PTO switch 40 to assure that the starter can be cranked only when the vehicle is braked (the switch 104 is closed) and the PTO switch 40 is off. An okay to start indicator lamp 108 is connected between the switched power source and the terminal 42b of the PTO switch 40 which grounds one side of the lamp 108 when the PTO switch is off.

To maintain the engine running without an operator on the vehicle seat, the operator switches the PTO switch to the off position so the terminal 42b is grounded and puts the vehicle in the braked condition so the switch 104 closes, thereby enabling the circuit 100 to provide an alternate ground path from the coil 28 of the relay 27 through the diode 102, the switch 104 and the PTO switch terminals 42b–40b. The operator then can leave his seat, and when the switch 30 opens, the coil 28 remains energized to prevent deactivation of the relay 27. If at any time while the operator is away from the seat the brake switch 104 is opened or the PTO switch is moved from the off (down) position, the relay 27 will be deactivated and the engine ignition will be grounded through the terminal 36 to kill the engine.

Having described the preferred embodiment, it will become apparent that various modifications can be made without departing from the scope of the invention as defined in the accompanying claims.

I claim:

1. In a lawn and garden vehicle having an operator station, an engine with a starter and ignition system, a ground drive system for propelling the vehicle, the ground drive system including brake structure for providing vehicle drive and non-drive conditions, an activatable tool drive such as a power take off (PTO) for powering an accessory, a first switch connected between a source of electrical power on the vehicle and the starter and ignition system and operable for permitting switch controlled starting of the engine when the vehicle is in the non-drive condition, an activatable relay connected to the ignition system, an operator presence switch structure connected to the relay and responsive to the presence of an operator at the operator station for activating the relay and permitting operation of the engine when the operator is present at the operator station and deactivating the relay to ground the ignition system and kill the engine when the operator is away from the operator station, a circuit permitting operation of engine under limited conditions when the operator is away from the operator station, the circuit comprising:

a PTO switch connected to the activatable tool drive, the PTO switch having an on condition for activating the tool drive when the operator is present at the operator station and an off condition for deactivating the tool drive, and wherein the PTO switch includes a grounding terminal having a grounded condition when in the PTO switch is in the off condition; and a brake switch connected between the grounding terminal of the PTO switch and the operator presence switch structure and having a closed condition when the vehicle is in the non-drive condition, wherein the relay includes an activation coil with a first lead connected to said source of power and a second lead connected to the grounding terminal of the PTO switch through the brake switch so that a closed path to ground is provided from the relay coil to ground when the vehicle is in the non-drive condition and the PTO switch is in the off condition.

2. The invention as set forth in claim 1 wherein the circuit includes a diode connected between the PTO switch and the operator presence structure.

3. The invention as set forth in claim 1 including a blocking diode connected in series with the brake switch, and wherein the starter and ignition system is also connected to the brake switch, the blocking diode preventing establishment of a path to ground from the starter and ignition switch through the operator presence switch structure.

4. In a lawn and garden vehicle having an operator station, an engine with a starter and ignition system, a vehicle drive system for propelling the vehicle over the ground in a vehicle drive condition, the drive system including brake structure for providing a vehicle non-drive condition, an electrically controlled tool drive for powering an accessory, a first switch connected between a source of current on the vehicle and the starter and ignition system and operable for switch controlled starting of the engine when the vehicle is in the non-drive condition, interlock circuitry connected to the tool drive and including a relay connected to an activatable operator presence switch, the relay responsive to the operator presence switch and having a first state when the presence switch is activated and a second state disabling the ignition system to stop the engine when the presence switch is not activated; an accessory switch having at least first and second terminals, the first terminal connected to the relay and to the activatable tool drive, the accessory switch having an on condition for providing a ground connection from the tool drive through the relay for activating the tool drive when the relay is in the first state, the accessory switch also having an off condition for deactivating the tool drive; a vehicle drive condition switch having a first state when the vehicle is in the non-drive condition and a second state when the vehicle is in the drive condition, the drive condition switch connected between the second terminal of the accessory switch and the relay, the relay responsive to the drive condition switch being in the first state and the accessory switch being in the off condition for causing the relay to assume the first state to thereby prevent stopping of the engine when the operator presence switch is in the second state.

5. The invention as set forth in claim 4 wherein the ground drive condition switch is connected to the first switch to provide a ground path for the starter and ignition system when the accessory switch is in the off position.

6. The invention as set forth in claim 5 further comprising a blocking diode connected between the relay and the ground drive switch for establishing an alternate ground path from the relay.

7. The invention as set forth in claim 6 wherein the blocking diode has a first lead connected between the relay and the seat switch and prevents a ground path from the starter and ignition system through the diode and the seat switch.

8. The invention as set forth in claim 4 wherein the second terminal of the accessory switch is connected to ground when the accessory switch is in the off condition.

* * * * *